United States Patent
Nguyen et al.

(10) Patent No.: US 7,443,973 B2
(45) Date of Patent: *Oct. 28, 2008

(54) CALLER CONTROL OF INTERNET CALL WAITING

(75) Inventors: Hong Thi Nguyen, Atlanta, GA (US); Linda Ann Roberts, Decatur, GA (US); Edward Michael Silver, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 108 days.

This patent is subject to a terminal disclaimer.

(21) Appl. No.: 11/158,539

(22) Filed: Jun. 22, 2005

(65) Prior Publication Data

US 2005/0238158 A1    Oct. 27, 2005

Related U.S. Application Data

(63) Continuation of application No. 10/176,572, filed on Jun. 21, 2002, now Pat. No. 6,931,117.

(51) Int. Cl.
*H04M 3/42* (2006.01)
*H04M 11/00* (2006.01)

(52) U.S. Cl. .......................... 379/215.01; 379/208.01; 379/93.01

(58) Field of Classification Search ............... 379/215.1, 379/208.01, 93.01
See application file for complete search history.

(56) References Cited

U.S. PATENT DOCUMENTS

| | | |
|---|---|---|
| 4,935,951 A | 6/1990 | Robinson et al. |
| 4,993,058 A | 2/1991 | McMinn et al. |
| 5,012,507 A | 4/1991 | Leighton et al. |
| 5,161,180 A | 11/1992 | Chavous |
| RE34,677 E | 7/1994 | Ray et al. |
| 5,511,111 A | 4/1996 | Serbetcioglu |
| 5,526,406 A | 6/1996 | Luneau |
| 5,621,379 A | 4/1997 | Collins |
| 5,673,304 A | 9/1997 | Connor et al. |
| 5,724,412 A | 3/1998 | Srinivasan |
| 5,796,806 A | 8/1998 | Birckbichler |
| 5,805,587 A | 9/1998 | Norris et al. |
| 5,883,942 A | 3/1999 | Lim et al. |
| 5,940,474 A | 8/1999 | Ruus |
| 5,940,475 A | 8/1999 | Hansen |
| 6,009,148 A | 12/1999 | Reeves |

(Continued)

OTHER PUBLICATIONS

U.S. Appl. No. 11/318,110, filed Dec. 2005.

(Continued)

*Primary Examiner*—Rasha Alaubaidi
(74) *Attorney, Agent, or Firm*—Scott P. Zimmerman, PLLC

(57) ABSTRACT

Caller Control of Internet Call Waiting (ICW) Services are provided to disconnect an active ICW session and data connection and to prevent establishment of a subsequent data connection. In an exemplary embodiment, a calling party places an incoming call to a called telephone number having the active ICW session and data connection. The calling party may enter an authorized code that authorizes disabling of ICW and the data connection. The interrupt code entered by the calling party is received in a telecommunications network, such as, for example the Public Switched Telephone Network (PSTN) or a mobile switching network. The telecommunications network verifies that the interrupt code to enable caller control, and, thereafter, disables the ICW session and data connection.

21 Claims, 13 Drawing Sheets

U.S. PATENT DOCUMENTS

| | | |
|---|---|---|
| 6,011,473 A | 1/2000 | Klein |
| 6,104,800 A | 8/2000 | Benson |
| 6,144,644 A | 11/2000 | Bajzath et al. |
| 6,208,718 B1 | 3/2001 | Rosenthal |
| 6,208,726 B1 | 3/2001 | Bansal et al. |
| 6,219,413 B1 | 4/2001 | Burg |
| 6,259,692 B1 | 7/2001 | Shtivelman et al. |
| 6,310,946 B1 | 10/2001 | Bauer et al. |
| 6,661,785 B1 | 12/2003 | Zhang et al. |
| 6,680,998 B1 | 1/2004 | Bell et al. |
| 6,703,930 B2 | 3/2004 | Skinner |
| 6,718,021 B2 | 4/2004 | Crockett et al. |
| 6,724,872 B1 | 4/2004 | Moore et al. |
| 6,771,742 B2 | 8/2004 | McCalmont et al. |
| 6,792,081 B1 | 9/2004 | Contractor |
| 6,804,338 B1 | 10/2004 | Chen |
| 6,816,481 B1 | 11/2004 | Adams et al. |
| 6,842,448 B1 | 1/2005 | Norris et al. |
| 6,868,074 B1 | 3/2005 | Hanson |
| 6,912,399 B2 | 6/2005 | Zirul et al. |
| 6,931,117 B2 | 8/2005 | Roberts et al. |
| 6,940,950 B2 | 9/2005 | Dickinson et al. |
| 2002/0072348 A1 | 6/2002 | Wheeler et al. |
| 2002/0160745 A1 | 10/2002 | Wang |
| 2003/0211839 A1 | 11/2003 | Baum et al. |
| 2003/0216148 A1 | 11/2003 | Henderson |
| 2004/0037403 A1 | 2/2004 | Koch |
| 2004/0057425 A1 | 3/2004 | Brouwer et al. |
| 2004/0101123 A1 | 5/2004 | Garcia |
| 2004/0140928 A1 | 7/2004 | Cleghorn |
| 2005/0047574 A1 | 3/2005 | Reid |
| 2005/0063519 A1 | 3/2005 | James |
| 2005/0151642 A1 | 7/2005 | Tupler et al. |
| 2005/0175166 A1 | 8/2005 | Welenson et al. |
| 2005/0190750 A1 | 9/2005 | Kafka |
| 2005/0190892 A1 | 9/2005 | Dawson et al. |
| 2005/0232243 A1 | 10/2005 | Adamczyk |
| 2005/0250468 A1 | 11/2005 | Lu |

OTHER PUBLICATIONS

US 5,905,788, 05/1999, Bauer et al. (withdrawn)

CALLER CONTROL OF INTERNET CALL WAITING

CROSS REFERENCE

This application is a continuation of commonly assigned U.S. patent application Ser. No. 10/176,572, filed Jun. 21, 2002 and entitled "Caller Control of Internet Call Waiting" now issued as U.S. Pat. No. 6,931,117, and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments generally relate to the field of communications. More particularly, the exemplary embodiments relate to special services implemented over a telecommunications network that enable a calling party to interrupt or cancel an Internet Call Waiting (ICW) session.

Telecommunications has experienced explosive growth, and more growth is planned as telecommunication access and numerous communication devices improve. This explosive growth is revolutionizing special services offered to subscribing customers. Of the special service offerings, the most relevant to this invention is the ICW service. A user of a personal computer (PC) or other Internet Protocol (IP) addressable communications devices with an active ICW session is able to receive information about incoming calls from a calling telephone number without interrupting an active data connection between the PC and a data network, such as the World Wide Web, an Internet, an Intranet, or an Extranet. Presently available ICW systems provide the calling telephone number, a billing name associated with the calling telephone number, and call handling options. Presently available ICW systems provide the calling telephone number, a billing name associated with the calling telephone number (if available), and call handling options. Call handling options typically include disabling the ICW session and data connection to answer the call, putting the call on hold and presenting a message to a calling party that a called party is aware of the call and will answer the incoming call shortly, routing the call to a voice mailbox associated with the called telephone number, ignoring the call, and forwarding the call to another telephone number. These options are presented to the user in a Graphical User Interface (GUI) that appears as a pop-up screen with separate command buttons. The user clicks on a desired call handling command button on the screen for the ICW PC software application and the selected option is transmitted to the telecommunications network over the Internet. The telecommunications network then processes the call according to the selected handling option.

Most subscribers of ICW services rely on a single telephone line to make voice calls and to access a data network. When the telephone line is utilized for a data connection (e.g., via modem), an ICW session is often automatically activated by a dialing software, which dials an appropriate prefix code for activating ICW before dialing the telephone number to establish the link with the data network. For example, a user's communications device may dial a telephone number of an Internet Service Provider (ISP) for access to the world wide web including an Internet, Intranet, Extranet, or other data network. Given that there is only one telephone line and ICW has been activated, the user of the connected PC controls whether incoming calls are answered or not. That is, if the user is notified of the incoming call, then the user may choose to not answer the call and maintain an on-line session via the data connection. Consequently, the calling party cannot interrupt or disable ICW and the data connection to force the user to answer the incoming call. For example, a parent seeking to call his/her own home number may hear ringing, but no answer, as a consequence of a child's failure to associate the calling telephone number with his/her parent and the child's unwillingness to interrupt or terminate an Internet gaming session and answer the incoming call. Consequently, the parent is unable to reach a party at his/her home.

Therefore, there is a need for systems and methods that allow a calling party to interrupt or disable ICW and the data connection so that the incoming call can be received. Further, there is a need to notify the user of a communications device engaged in the on-line session with a message that the ICW and the data connection may be interrupted or disabled to allow the incoming call to be connected. Finally, there is a need to provide various authorization levels to control the interruption or disabling of ICW and the data connection.

SUMMARY

According to exemplary embodiments, the needs described above and other needs are met by providing a telephony network-based solution that allows a calling party to interrupt or disable an ICW session and a data connection (also referred to as an on-line session) of an IP addressable communications device (hereinafter referred to as an "IP communications device") at a called telephone number so that an incoming call can be connected. As used herein, the term IP communications device includes a wireless phone, a cellular phone, a satellite phone, a computer, a modem, an audio pager, a personal digital assistant, a WAP phone, a digital signal processor, a global positioning system transceiver, an interactive television, an MP3 player, and other IP addressable communications devices capable of delivering audio, video, and/or data communications. According to some of the embodiments, the IP communications device includes a personal computer (PC) system (also referred to herein as computer system).

In an exemplary embodiment, the calling party places an incoming call to a called telephone number that has activated the ICW service and established the data connection. The calling party enters an interrupt code that authorizes interruption or disabling of ICW and the data connection to the called telephone number. The interrupt code entered by the calling party is received in a telecommunications network, such as, for example the Public Switched Telephone Network (PSTN), a mobile switching network, and other networks providing telecommunications services. The telecommunications network determines whether the entered interrupt code is associated with the called telephone number to verify authorization to interrupt or disable ICW and the data connection. After verification, the ICW service and the on-line session (e.g., an interactive gaming session) of the data connection may be interrupted or disabled so that the incoming call can be connected. Further, the telecommunications network or the data network may send a notification message to the computer system of the called telephone number to notify a user that the ICW session and the data connection are about to be interrupted and/or disabled.

In another exemplary embodiment, the interrupt code may be assigned different levels of authority for interrupting ICW and the data connection. Similarly, in another embodiment, the interrupt code may be assigned different levels of authority for disabling ICW and the data connection. For example, Calling Party Mom (i.e., a calling party that is a mother) may have an interrupt code that always allows interruption or disabling of the ICW and data connection (i.e., no authorization from user required). However, Calling Party Child (i.e., a calling party that is a child) may have an interrupt code that sends the notification message that Calling Party Child is trying to place an incoming call and prompts the user of the computer system to accept or to enter an authorization code in order to interrupt or to disable ICW and/or the data connection. If the user of the communications device does not accept or enter the authorization code or if the user fails to respond to the verification prompt within a selected period of time, then the telecommunications network may default to interrupt or to disable ICW and/or the data connection.

In still another exemplary embodiment, the telecommunications network allows the calling party to interrupt the ICW service and connects the incoming call. The incoming call may be connected by temporarily interrupting or pausing an interactive on-line session via the data connection and routing the incoming call to the computer system over the data connection (e.g., an IP call). In an alternate embodiment, the incoming call may be connected by disabling or disconnecting the data connection and routing the incoming call to the called telephone number (e.g., to a telephone at the called telephone number). In this alternate embodiment, the telecommunications network may prevent the called telephone number from trying to re-establish the data connection and/or from placing an outgoing call until the incoming call is routed, received, and/or answered via the called telephone number.

Another exemplary embodiment describes an apparatus that generates or otherwise transforms the notification message routed to the computer system to an audible and/or visual announcement that can be presented by the computer system. The apparatus includes a network port, a memory device, and a digital signal processor. The network port receives the notification message from the telephone network. The memory device stores a selection of announcement formats to accompany the notification message. The digital signal processor communicates with the memory device and selects an announcement format based upon information contained within the notification message. The information contained within the notification message could also be associated with network information provided by the telecommunications system. After the announcement format is selected and retrieved from the memory device, the apparatus could also include a system that presents and/or plays the notification message.

Other systems, methods, and/or computer program products according to some of the embodiments will be or become apparent to one with skill in the art upon review of the following drawings and the detailed description of the exemplary embodiments. It is intended that all such additional systems, methods, and/or computer program products be included within and protected by this description and be within the scope of this invention.

DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE EXEMPLARY EMBODIMENTS

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the schematics, flowcharts, block diagrams, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
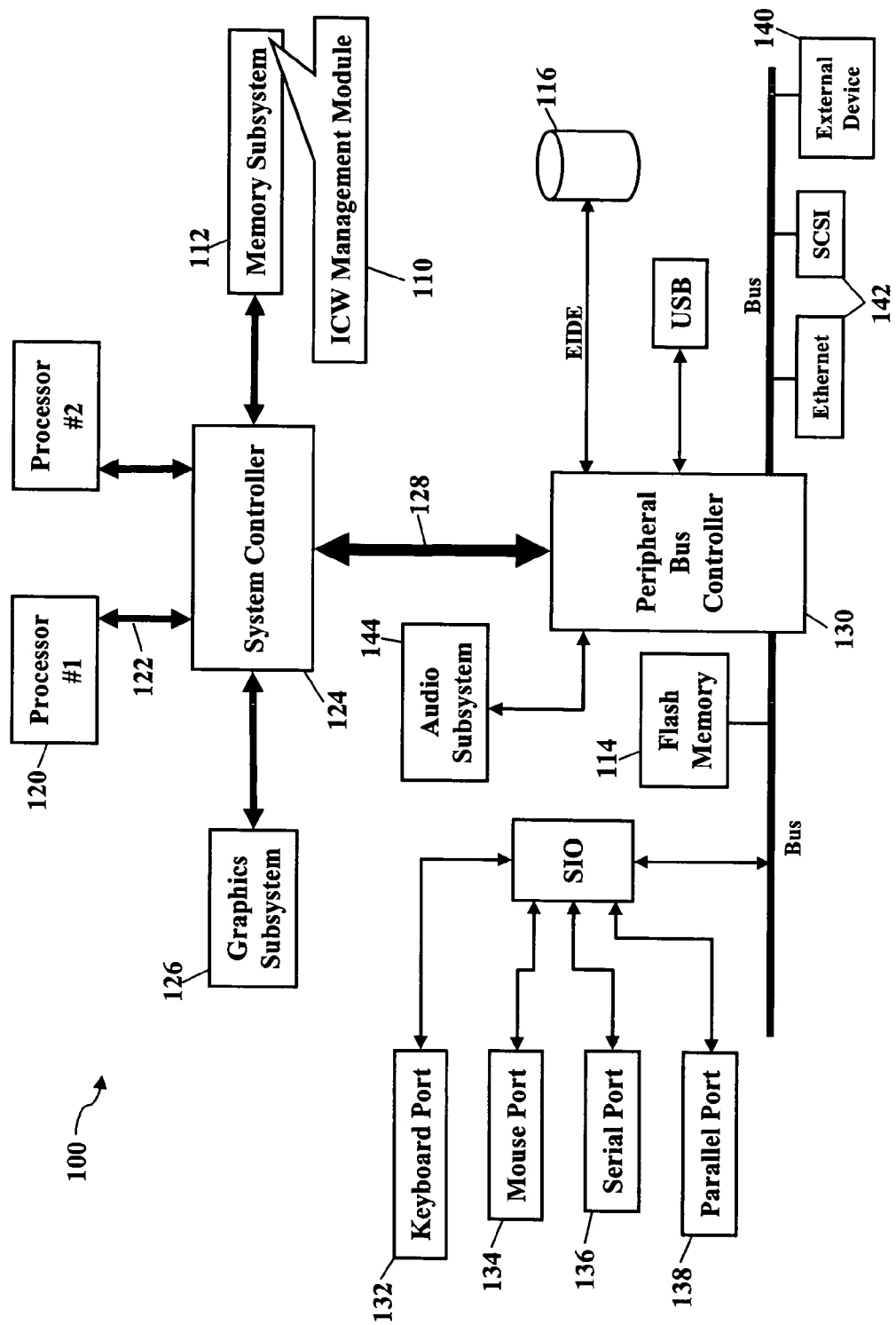
FIG. 1 is a block diagram showing of the ICW Management Module that resides in a computer system according to an exemplary embodiment of this invention.

Referring now to the figures, FIG. 1 is a block diagram showing an ICW Management Module 110 residing in a computer system 100. The ICW Management Module 110 operates within a system memory device. The ICW Management Module 110, for example, is shown residing in a memory subsystem 112. The ICW Management Module 110, however, could also reside in flash memory 114 or peripheral storage device 116. The computer system 100 also has one or more central processors 120 executing an operating system. The operating system, as is well known, has a set of instructions that control the internal functions of the computer system 100. A system bus 122 communicates signals, such as data signals, control signals, and address signals, between the central processor and a system controller 34 (typically called a "Northbridge"). The system controller provides a bridging function between the one or more central processors 120, a graphics subsystem 126, the memory subsystem 112, and a PCI (Peripheral Controller Interface) bus 128. The PCI bus 128 is controlled by a Peripheral Bus Controller 130. The Peripheral Bus Controller 130 (typically called a "Southbridge") is an integrated circuit that serves as an input/output hub for various peripheral ports. These peripheral ports could include, for example, a keyboard port 132, a mouse port 134, a serial port 136 and/or a parallel port 138 for a video display unit, one or more external device ports 140, and networking ports 142 (such as SCSI or Ethernet). The Peripheral Bus Controller 130 could also include an audio subsystem 144.

The processor 710 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.5128.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com).

In an exemplary embodiment, the operating system is WINDOWS® (WINDOWS® is a registered trademark of Microsoft Corporation, One Microsoft Way, Redmond Wash. 98052-6399, 425.882.8080, www.Microsoft.com). Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com).

The system memory device (shown as memory subsystem 112, flash memory 114, or peripheral storage device 116) may also contain an application program. The application program cooperates with the operating system and with a video display unit (via the serial port 136 and/or the parallel port 138) to provide a GUI-for the ICW Management Module 110. The GUI typically includes a combination of signals communicated along the keyboard port 132 and the mouse port 134. The GUI provides a convenient visual and/or audible interface with the customer or user of the computer system 100. As is apparent to those skilled in the art, the selection and arrangement of the ICW Management Module 110 to manage caller control of an Internet Call Waiting (ICW) session and a data connection (hereinafter referred to as "Caller Control of ICW Services") may be programmed over a variety of alternate mediums, such as, for example, a voice-activated menu prompt, an interactive session with an telecommunications network administrator, and the like.

The ICW Management Module 110 allows a user to manage ICW services, such as (1) allowing the user to customize presentation and features of a disable notification message, an interruption notification message, and/or an authorization message and (2) allowing the user to control how the data connection is interrupted. For example, the user may select a desired presentation format presented by computer system 100 or an alternate IP communications device servicing a called telephone number (or to a Service Node address). The desired presentation format may be based upon information associated with an ICW Services Profile 255, a name associated with the calling telephone number, a time of day, a date identifier (e.g., day of week, calendar date, etc.), other information associated with the ICLID signal, length and/or duration of a disable notification message, an interrupt notification message and/or an authorization message, display of GUI (e.g., color, font, placement of ICW Management Module on display device, etc.), etc. The ICW Management Module 110 also allows the user to control how the data connection is interrupted, paused, and/or suspended (if ICW and data connection are not canceled). Since the Caller Control of ICW Services makes use of TCP/IP or other similar technology, an on-line session of the data connection (e.g., checking e-mail, playing a game, reading an article, etc.) may be suspended or interrupted while the incoming call is communicated and/or responded to. For example, if the user was reading an on-line article when the incoming call was received, the user could answer the incoming call, and then, after hanging-up, the user could return to reading the article after the incoming call was terminated. In an exemplary embodiment, the interruption control of the ICW Management Module functions to provide a book-marking feature and/or otherwise remembers the web address. Further, the interruption control of ICW Management Module may also save information input by the user, so that the user does not data or other information input by the user. Thus, the ICW Management Module provides a convenient and user-friendly interface that allows the customer and/or user to manage Caller Control of ICW services and to integrate telephony events with data network events.

Figure 2:
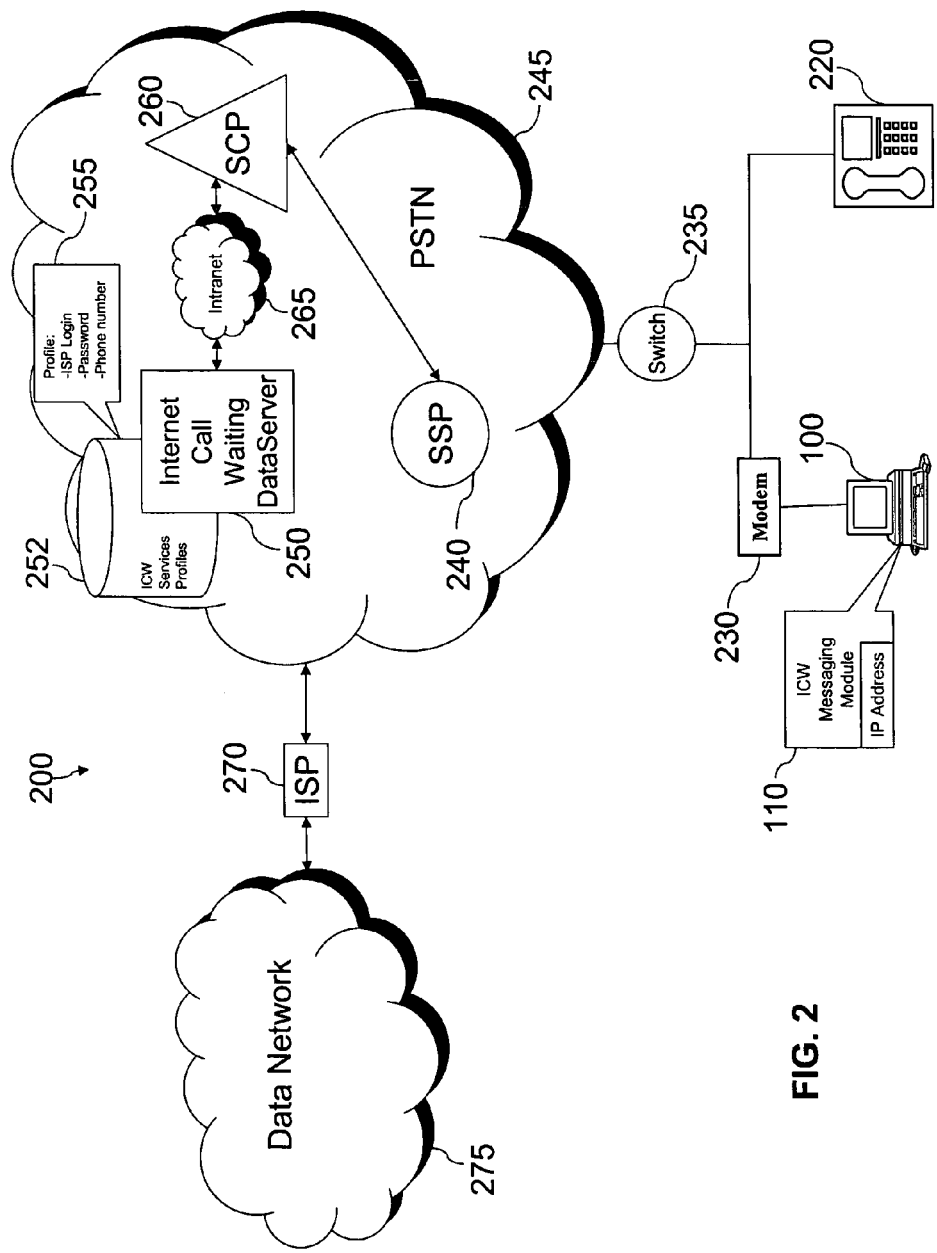
FIG. 2 is a schematic of a telecommunications system showing a computer system engaged in an ICW session and a data connection according to an exemplary embodiment of this invention.

FIG. 2 is a schematic showing the ICW Management Module 110 operating within a telecommunications system 200 for implementing Caller Control of ICW Services according to an embodiment of this invention. The telecommunications system 200 includes the computer system 100, the ICW Management Module 110 (including the IP address associated with the ICW session and data connection) residing within computer system 100, a POTS telephone 220, a modem 230, a telecommunications switch 235, a Public Switched Telephone Network (PSTN) 245 including a service switching point (SSP) 240, an Internet Call Waiting (ICW) DataServer 250 including a database of ICW Services Profiles 252 and a Profile 255, a service control point (SCP) 260, and an Intranet 265, an Internet Service Provider (e.g., America On-Line) 270, and a data network 275.

Typically, a subscribing customer (i.e., a customer of the Caller Control of ICW Service) or a user at the customer's premises has access to the computer system 100 and/or the telephone 220. For example, if a user wishes to call a particular telephone number, the user may use telephone 220 to dial the telephone number and establish a voice connection. If, however, the user wishes to send, receive, or access voice, video, and/or data (e.g., read and respond to e-mail, order products, view video-clips, listen to music, engage in an interactive gaming session, etc.), then modem 230 allows the computer system 100 to access the data network 275 via the PSTN 245. To facilitate the data connection through modem 230 and Internet Service Provider (ISP) 170, the PC 130 typically uses Internet browsing software (or other appropriate software to manage the data connection), such as, for example, MICROSOFT EXPLORER® or NETSCAPE NAVIGATOR®.

Whether the user is attempting to make a voice connection or a data connection, each telephone number dialed from the customer's premises is sent to the PSTN 245 via switch 235. Thereafter, the PSTN 245 connects the outgoing call to a dialed telephone number (or to another Service Node address) to establish the voice connection (not shown) or to the ISP 270 to establish the connection with the data network 275. Communications signals sent from the customer's premises arrive at SSP 240 that analyzes the signals and determines routing of the outgoing call. Depending on the dialed telephone number, the SSP may route the outgoing call immediately over the PSTN 245 to attempt a connection or the SSP may communicate with SCP 260 for further call processing and routing information. Further, the PSTN 245 may include private network elements, such as private branch exchanges (PBXs) and/or other elements. The PSTN 245 includes Advanced Intelligent Network (AIN) componentry controlling many features of the network. The PSTN 245 or switch 235 could also include a packet-based "soft switch" that uses software control to provide voice, video, and/or data services by dynamically changing its connection data rates and protocols types. If the PSTN 245 or switch 235 should include a softswitch, the AIN componentry is replaced by an application server that interfaces with the softswitch via a packet protocol, such as Session Initiation Protocol (SIP). The signaling between the computer system 100, the switch 235, the PSTN 245 including AIN componentry, and the data network 275, however, are well understood in by those of ordinary skill the art and will not be further described. Further, those of ordinary skill in the art will be able to apply the principles of this invention to their own network configurations which may differ substantially from the telecommunications system shown in the figures.

ICW DataServer 250 communicates with SCP 260 and Intranet 265 to effectively provide ICW services to users of the PSTN 245 so that ICW can be activated, de-activated, administered by the telecommunications provider, and controlled or managed by the subscribing customer, user, or other entity with authorization. Thus, ICW DataServer 250 functions as a computer server and database dedicated to managing ICW services over data network 275 and PSTN 245. ICW DataServer 250 communicates with the data network 275 using standard transmission control protocol and Internet protocol (TCP/IP). Further, the ICW Management Module 110, may be downloaded from ISP 270, ICW DataServer 250, Intranet 265, or provided on a storage media (e.g., diskette, CD-ROM, or installed by the computer system manufacturer) to a subscribing customer or user to install on the computer system 100 to enable, disable, and further control a variety of the ICW services (e.g., providing call handling options, such as routing an incoming call to voicemail, for incoming calls during the ICW session and data connection), including Caller Control of ICW Services.

In an exemplary embodiment, the ICW Management Module 110 is used to establish a Caller Control of ICW Services Profile. The ICW DataServer 250 stores a database of Caller Control of ICW Services Profiles 252. The customer interacts with the ICW Management Module 110 and with Intranet 265 to access and login to the ICW DataServer 250 and to establish a profile in the database of Caller Control of ICW Services Profiles 252. The Caller Control of ICW Service Profile 255 could contain a variety of fields and/or files associated with at least one of the following: an authorized calling party's telephone number (e.g., a telephone number associated with a cellular phone of a parent or a customer, etc.), the customer's ISP login information, ISP password, a static IP address (if applicable), preferences for interrupting or disabling (e.g., always automatically disable ICW and data connection, always automatically interrupt ICW and data connection, prompt caller for selection to interrupt or disable, etc.), preferences for sending a notification message to the computer system 100 prior to interrupting or disabling (e.g., always send notification message prior to disabling, never send notification message prior to interrupting, prompt caller for selection of notification message, etc.), and preferences for requesting an authorization code back from a user of the computer system 100 prior to interrupting or disabling (e.g., always prompt user for authorization, only prompt user for authorization if calling party wants to disable, etc.).

Figure 3:
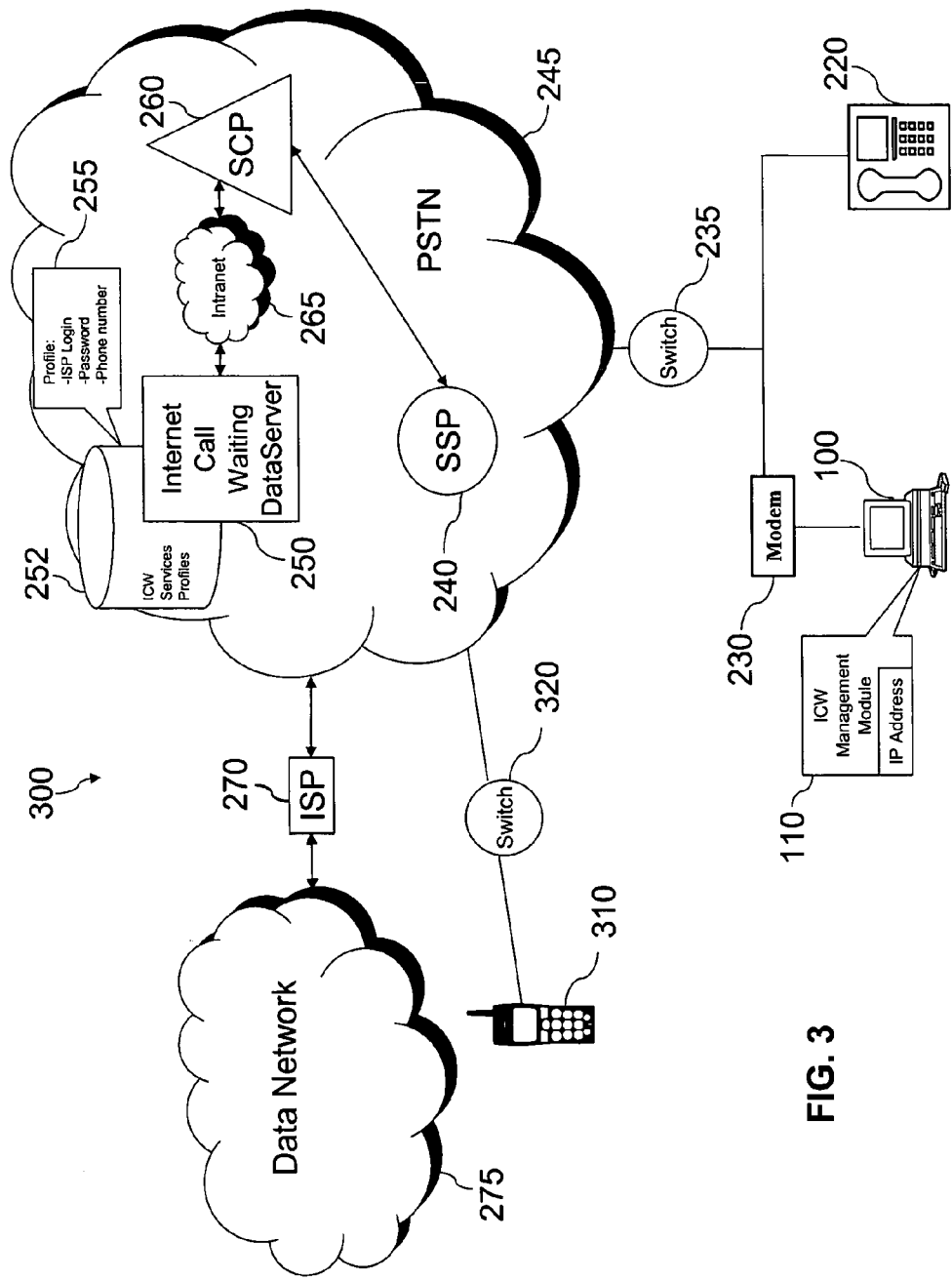
FIG. 3 is a schematic of an incoming call to the telecommunications system shown in FIG. 2.

FIG. 3 illustrates a telecommunications system 300 with an incoming call from a cellular phone 310 that is transmitted to an antenna (not shown) and then coupled to a mobile telecommunications switch 320 and to the PSTN 245. Typically, the incoming call is placed by an authorized caller (e.g., subscribing customer or other entity registered with local telecommunications provider to control ICW services). The incoming call to the called telephone number is associated with the computer system 100 and the telephone 220. Because, however, a data connection is already established between the computer system 100 and the data network 275, In an exemplary embodiment, the PSTN 245 routes an active ICW session announcement to the cellular phone 310. This ICW session announcement alerts the calling party that the called telephone number has an active data connection. For example, the ICW session announcement might be an audible communication capable of being played over the cellular phone 310 and communicate that "The party you are calling has activated Internet Call Waiting and has established a data connection. Press 1 if you have an authorization code to interrupt or disconnect the Internet Call Waiting session and data connection . . . . " Alternatively, the announcement may be presented in a format that utilizes voice, video, and/or data to the cellular phone 310 used by the calling -party. In another embodiment, the calling party places an incoming call to the called telephone number, but the calling party is not actually notified that the called telephone number has an active ICW and data connection. Rather, the calling party hears a continued ringing, is placed into voicemail, is forwarded to another number, hears a message that the called number is not accepting calls, or is handled according to other call handling options available through the ICW service.

In the exemplary embodiments described above (e.g., calling party notified or not notified of ICW and data connection), the calling party may enter an interrupt code that authorizes disabling of ICW and the data connection. The entered authorization code is communicated from cellular phone 310 via switch 320 to PSTN 245. The ICW DataServer 250 verifies the entered authorization code. For example, the ICW DataServer 250 might look up a database of telephone numbers that subscribe to the Caller Control of ICW services. If the called telephone number matches a telephone number in the database, then the ICW DataServer 250 might further query the database to determine if the entered authorization code is associated with the called telephone number. If there is a match, then the ICW DataServer 250 would verify the entered authorization code and could then further associate the applicable Caller Control of ICW Services Profile 255.

Figure 4:
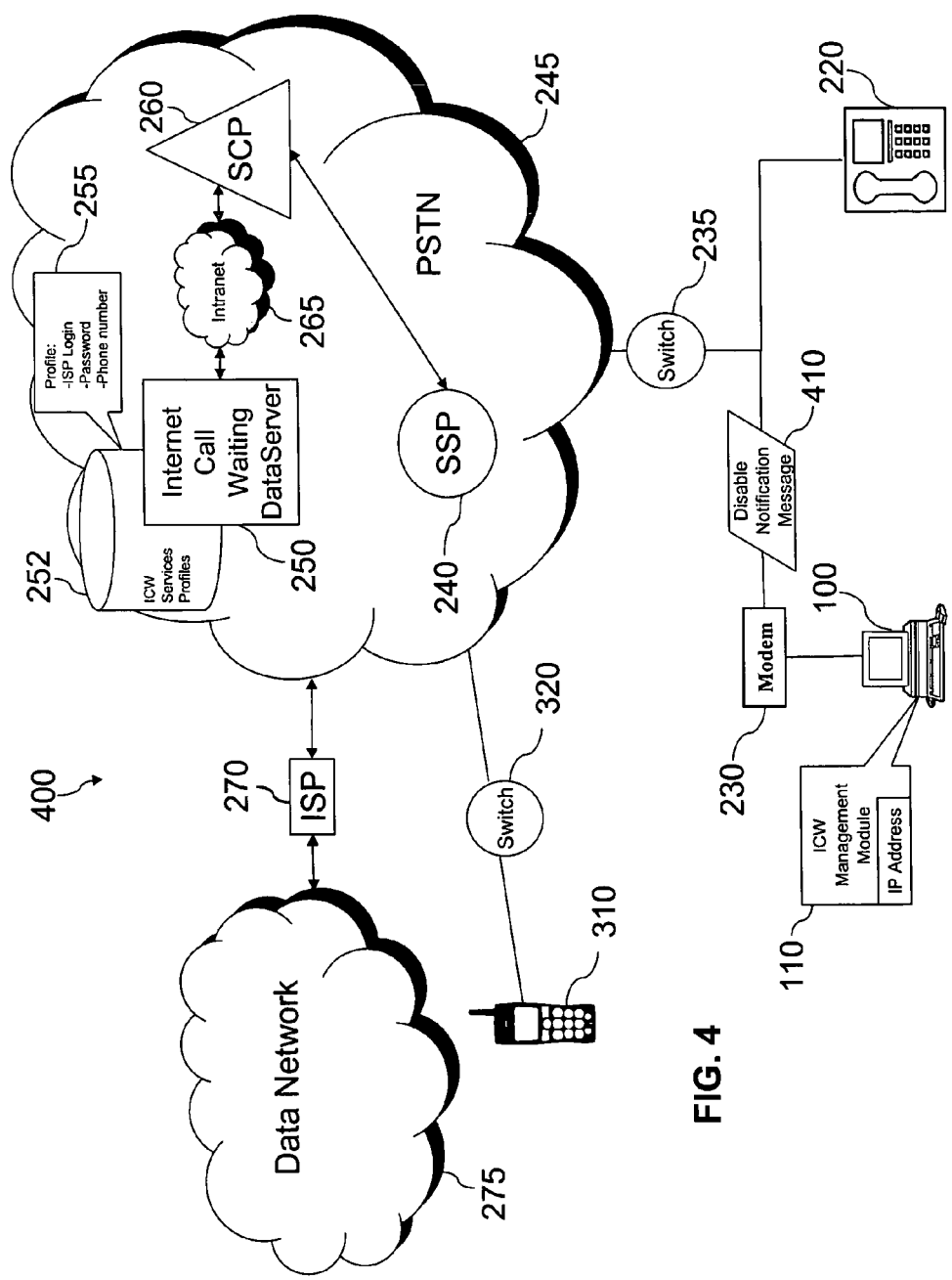
FIG. 4 is a schematic of a disable notification message generated by Caller Control of ICW Services or by an ICW Services Profile sent to the computer system of FIG. 2.

FIG. 4 illustrates a telecommunications system 400 similar to the telecommunications system disclosed in FIG. 3. Telecommunications system 400 includes an IP address query of the ICW Management Module 110 and a disable notification message 410. Some Internet Service Providers assign a "static" IP address to a customer's account, whereas other Internet Service Providers dynamically change a customer's IP address. A static IP address is permanently assigned to the customer, while a dynamic IP address may change with each login or may dynamically change during a session. PSTN 245 queries the ICW Management Module 110 for dynamic IP addressing so that the disable notification message 410 can be sent to computer system 100 through the telecommunications network 245. Alternatively, the IP address query could be sent from PSTN 245, routed over data network 275, and to an ISP IP address map (shown as ref. 930 in FIG. 9) assigned to the computer system. Regardless of how the IP address is accessed, the IP address is returned and communicated to the ICW DataServer 250 of the PSTN 245 so that switch 235 can communicate the disable notification message 410 to the computer system 100 via the IP address of the called telephone number. The disable notification message 410 may be communicated to the computer system 100 using an audio format, text format, video format, and combinations thereof.

The authorized calling party enters a verified authorization code to disable ICW and the data connection. In this embodiment, the calling party or the associated Caller Control of ICW Services Profile 255 associates the disable notification message 410 and sends a signal to switch 235. Switch 235 provides intelligence that the computer system 100 should be sent the disable notification message 410 prior to disabling. For example, a calling party may choose to send a disable notification message 410 so that the user is alerted of the urgency of the incoming call and doesn't mistakenly believe that the data connection has been disconnected due to a transmission error, delay over the data connection, problems at the ISP 270, software errors, or the like. Thus, the user is aware of the incoming call and doesn't try to re-establish the connection with the ISP 270.

After the disable notification message 410 is sent, the PSTN 245 disables, disconnects, or otherwise cancels the connection with the computer system 100. In some of the embodiments, the ICW Management Module 110 sends a signal to the PSTN 245 that disables, disconnects, or otherwise cancels the connection; however, PSTN 245 may be triggered to disable, disconnect, or otherwise cancel the connection by the Caller Control of ICW Services Profile 252 or alternate intelligence. After the connection is disabled, the incoming call is routed to the called telephone number associated with the telephone 220 via switch 235. In further exemplary embodiments, when the PSTN 245 disables, disconnects, or otherwise cancels the connection with the computer system 100, switch 235 may also send a communications signal that prevents a user from trying to re-establish the data connection and/or from placing an outgoing call until the incoming call is routed, received, and/or answered via the called telephone number. For example, this prevention may be initiated by modem 230 acting alone or with the ICW Management Module 110 to prevent the computer system 100 from establishing a data connection until the incoming call is routed to, received by, connected to, and terminated with (e.g., the conversation is over and the incoming call is disconnected) the called telephone number (or, alternatively a voice messaging system). According to another example, the computer system 100 may be prevented from establishing a data connection substantially immediately after receiving a disabling command from Caller Control of ICW Services so that the caller control of the incoming call is more likely brought to the user's attention. Further, this prevention may last for a prescribed period of time so that the incoming call can be connected to the telephone 220. For example, the prescribed period of time should be longer than four seconds if the ringing cycle is one second of ringing followed by three seconds of no ringing. After the prescribed period of time has passed, the modem and/or the ICW Management Module 110 could be reset to allow the user to re-establish the data connection. And, still according to another example, this prevention may be initiated by modem 230 acting alone or with the ICW Management Module 110 to prevent the computer system 100 from establishing a data connection regardless of the incoming call being routed, received, and/or connected to the called telephone number—that is, after the data connection is disabled, the data connection stays disabled until the PSTN 245 (or alternate communications network communicating with switch 235 or alternate communication with the ICW Management Module of computer system 100) receives an authorization code, password, and/or trigger to enable a subsequent data connection. This would be particularly useful for a parent that calls home to prevent a child from engaging in an active data session, such as when a parent away from the home wants to prevent an unsupervised data session.

Figure 5:
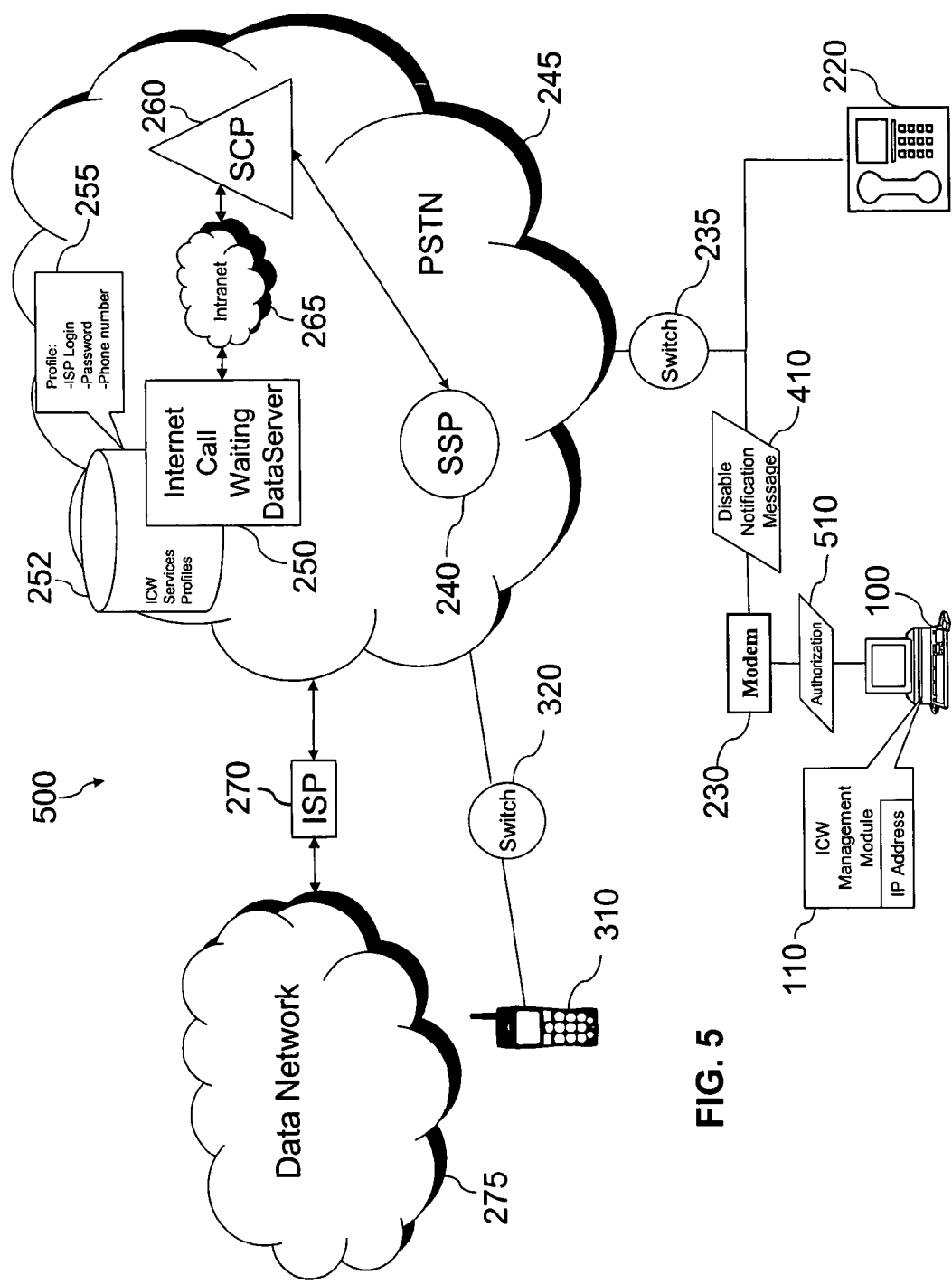
FIG. 5 is a schematic showing user authorization to disable the ICW session and the active data connection as shown in the telecommunications system of FIG. 2.

FIG. 5 illustrates a telecommunications system 500 similar to the telecommunications system disclosed in FIG. 4. In particular, telecommunications system 500 includes an authorization response 510 from the user of computer system 100 prior to disabling ICW and the data connection. The authorization response 510 might be most useful when different levels of authority for disabling ICW and the data connection are associated with the interrupt code. For example, Calling Party Mom may have an interrupt code that always allows disabling of the ICW and data connection. However, Calling Party Child may have an interrupt code that sends the disable notification message 410 to computer system 100 identifying that Calling Party Child is trying to place an incoming call. The disable notification message 410 prompts the user of computer system 100 to accept or to enter an authorization code in order to disable ICW and the data connection. If the user of the computer system 100 does not accept or enter the authorization response or if the user fails to respond to the authorization prompt within a selected period of time, then the PSTN 245 may default to disable ICW and the data connection. The PSTN 245 could, alternatively, default and not disable the data connection when the user fails to respond to the authorization prompt.

Figure 6:
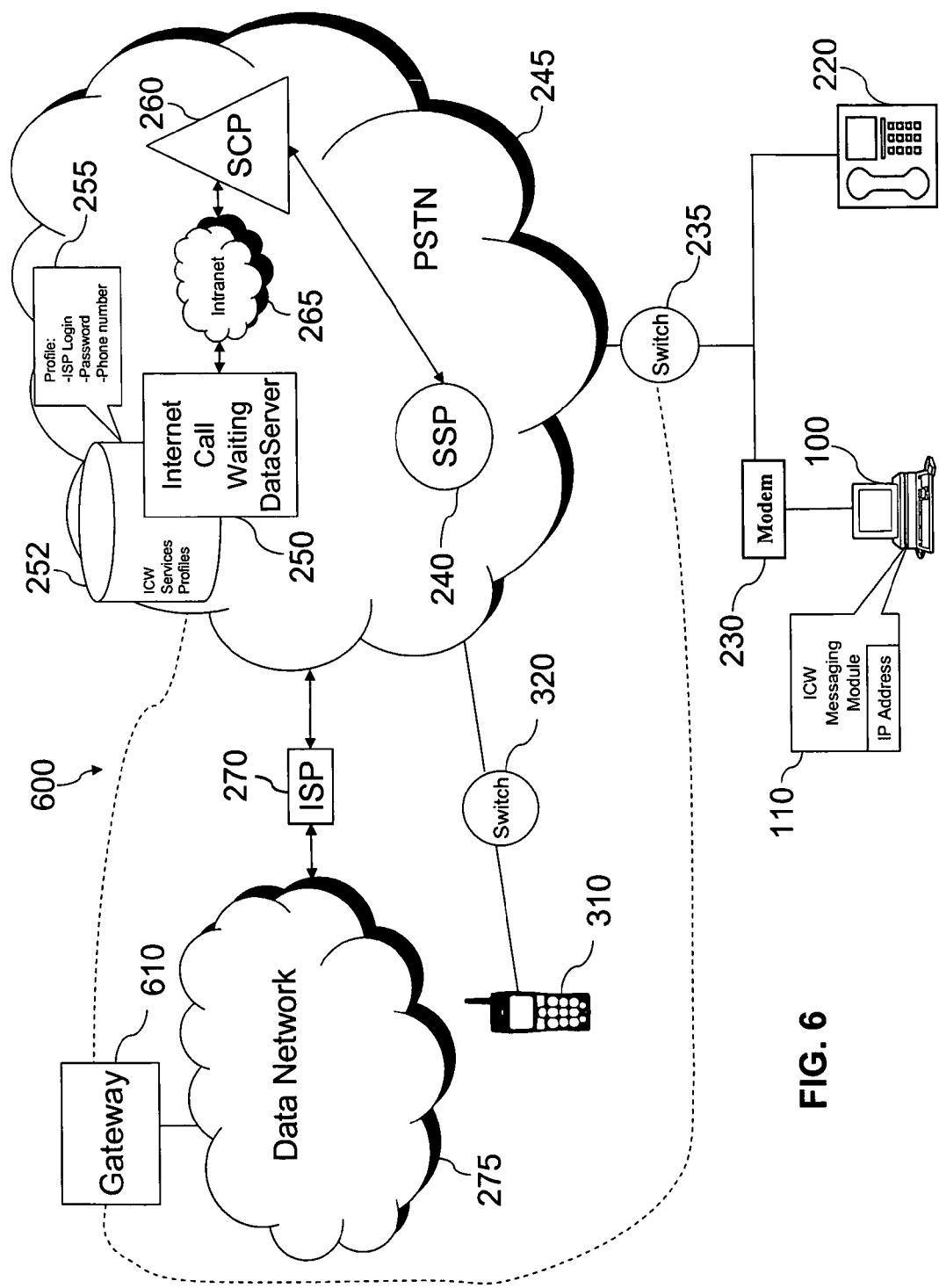
FIG. 6 is a schematic of a telecommunications system showing a gateway of a data network communicating with the computer system engaged in the ICW session and the data connection according to an exemplary embodiment of this invention.

In addition to disabling ICW and the data connection as described above with reference to the telecommunications systems in FIGS. 3-5, exemplary embodiments of this invention also allow the calling party to interrupt or suspend ICW and the data connection so that the incoming call can be connected (e.g., the incoming call is routed to an IP address associated with computer system 100). As shown in FIG. 6, telecommunications system 600 routes an incoming call to an IP address of computer system 100 via a gateway 610 communicating with the data network 275. The gateway 610 transmits a communications signal of the incoming call that utilizes the TCP/IP connection of the data network 275 with the computer system 100 so that the incoming call can be broadcast (i.e., presented via voice, video, and/or data communications) over the computer system 100. Consequently, the ICW feature that typically cancels call waiting during a data connection to prevent the incoming call from being routed over the PSTN 245 to the computer system 100 is ignored so that the incoming call utilizes the data connection between the computer system 100 and the data network 275 to establish communications between the calling party using cellular phone 310 and the user using computer system 100. Since the incoming call makes use of TCP/IP or other similar technology, an on-line session of the data connection (e.g., checking e-mail, playing a game, reading an article, etc.) may be suspended or interrupted while the incoming call is connected and answered. For example, if the user was reading an on-line article when the incoming call was received, the user could answer the incoming call, and then, after hanging-up, the user could return to reading the article after the incoming call was terminated. In an exemplary embodiment, the interruption control of the ICW service (via the ICW Management Module 110) functions to provide a book-marking feature and/or otherwise remembers the web address. Further, the interruption control of ICW may also save information input by the user, so that the user does not data or other information input by the user.

Figure 7:
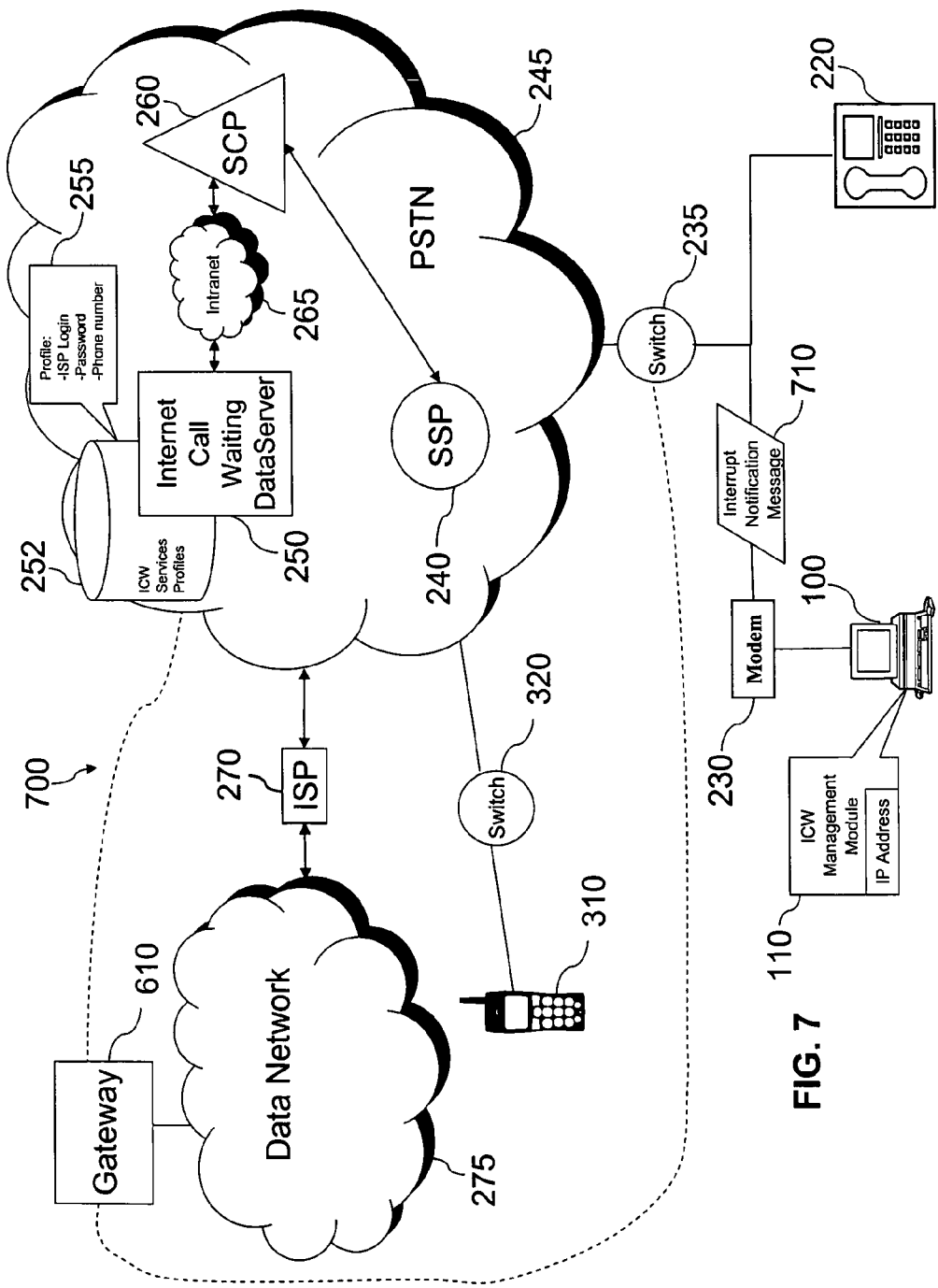
FIG. 7 is a schematic of a disable notification message generated by Caller Control of ICW Services or by an ICW Services Profile sent by a gateway of the telecommunications system shown in FIG. 6.

FIG. 7 illustrates a telecommunications system 700 including an interrupt notification message 710 similar to the disable notification message 410 communicated in the telecommunications system of FIG. 4. The interrupt notification message 710 alerts the user of computer system 100 that an incoming call is about to be routed and connected to the computer system 100. The interrupt notification message 710 may also alert the user of computer system 100 that any on-line sessions will automatically be suspended or interrupted. Further, the interrupt notification message 710 may allow the user to terminate or close-down an on-line session prior to routing and connecting the incoming communication. Interrupt notification message 710 may be communicated to the computer system 100 using an audio format, text format, video format, and/or combinations thereof.

Figure 8:
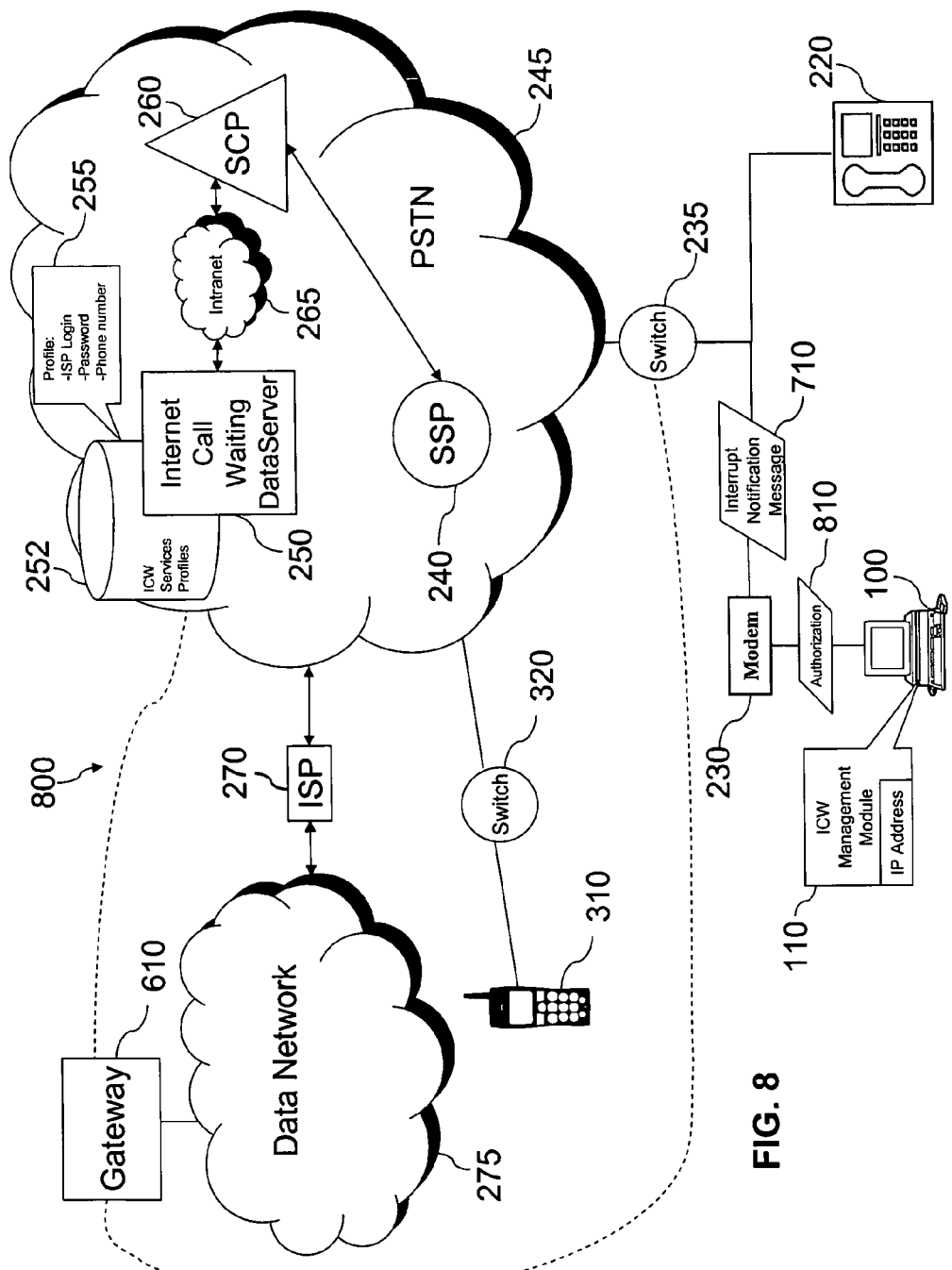
FIG. 8 is a schematic showing user authorization to disable the ICW session and the active data connection as shown in the telecommunications system of FIG. 6.

FIG. 8 illustrates a telecommunications system 800 including an authorization response 810 from the user of computer system 100 prior to interrupting ICW and the data connection. Authorization response 810 operates similar to authorization response 510 (as shown in FIG. 5) such that it allows the user of computer system 100 to authorize the interruption of the on-line session. If the user of the computer system 100 does not accept or enter the authorization response 810 or if the user fails to respond to the authorization prompt within a selected period of time, then the PSTN 245 may default to interrupt ICW and the data connection. If the user fails to respond to the authorization prompt, then the PSTN 245 could alternatively default and not interrupt ICW and the data connection.

Figure 9:
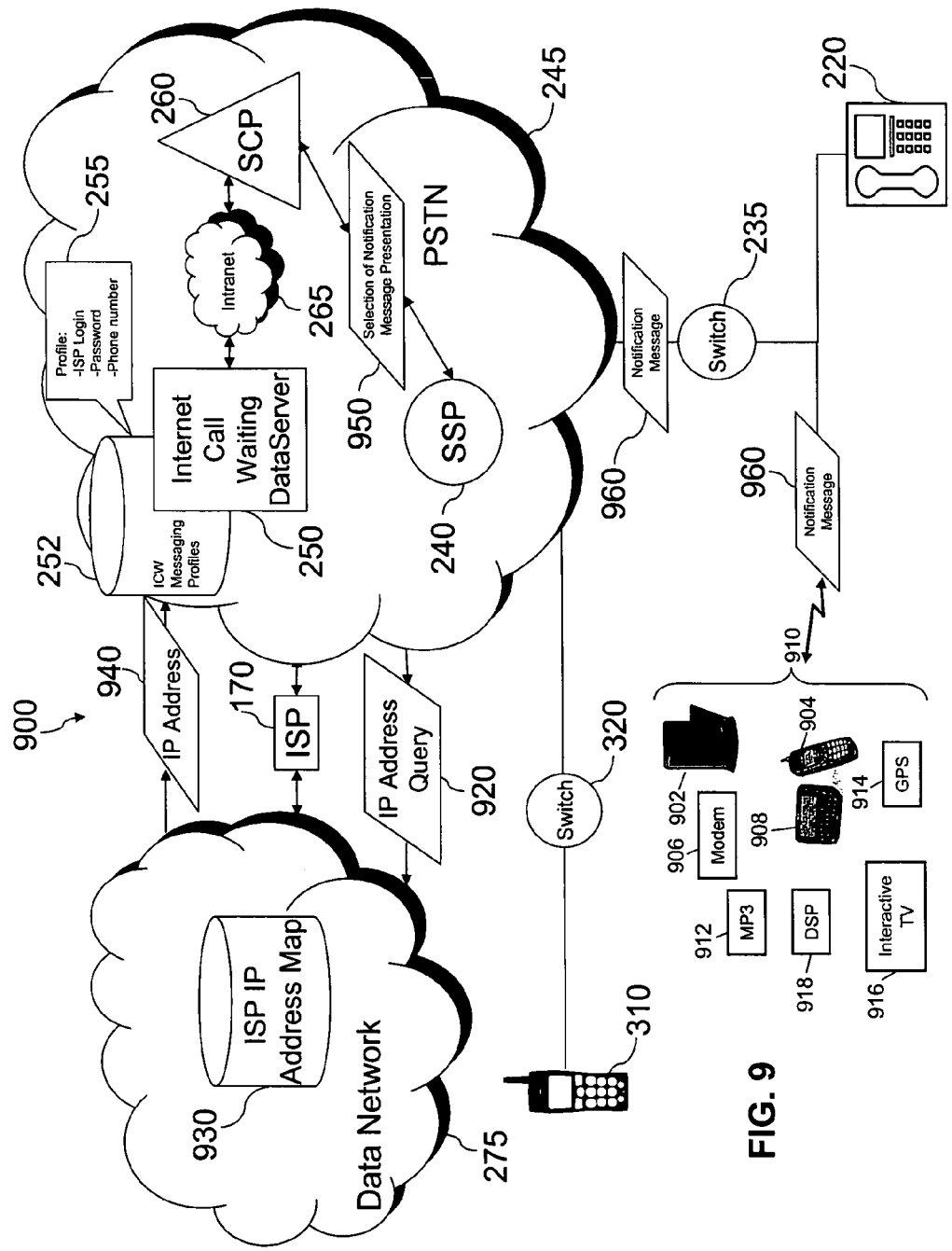
FIG. 9 is a schematic of a telecommunications system illustrating a notification message generated by Caller Control of ICW Services or by an ICW Services Profile for alternative IP communications devices engaged in the ICW session and data connection according to an exemplary embodiment of this invention.

While FIGS. 2-8 specifically show computer system 100 connected to the PSTN, any communications device having Internet Protocol (IP) addressing capabilities to service a called telephone number (or a Service Node address or the like) may be used, including, for example, a wireless phone, a cellular phone, a satellite phone, a computer, a modem, an audio pager, a personal digital assistant, a digital signal processor, a global positioning system transceiver, and an interactive television. For example, FIG. 9 illustrates a telecommunications system 900 having alternate IP communications devices 910, including a personal digital assistant (PDA) 902, an IP cellular phone 904, a modem 906, an interactive pager 908, an MP3 912, a global positioning system transceiver 914, an interactive television 916, and a digital signal processor 918, an IP address query 920, ISP IP address map 930, a search result with the IP address 940, a Selection of Notification message presentation 950, and at least one ICW message 960. A query that is made for dynamic IP addressing so that a notification message (e.g., a disable notification message and/or an interrupt message) can be sent to at least one of the alternate communications devices 910 through the telecommunications network 245. The IP address query 920 is sent from PSTN 245 (typically, via the ICW DataServer 250), routed over the data network 275, and to an ISP IP address map 930 serving the computer system 100. The IP address query 920 requests the IP address assigned to the alternate IP communications device 910. The IP address, for example, could be mapped to the ISP login information. If the ISP login information contained within the Caller Control of ICW Services Profile 255 matches the ISP's login information, then the PSTN 245 could have access to the ISP IP address map 930. Regardless of how the IP address is accessed, the IP address is returned and communicated to the ICW DataServer 250 of the PSTN 245 so that switch 235 can communicate at least one notification message(s) 960 to the alternate IP communications device 910 via the IP address of the called telephone number. Notification message 960 may be communicated to the alternate IP communications device 910 using an audio format, text format, video format, and combinations thereof. The Selection of ICW Notification Message Presentation 950 provides fields and/or files that appropriately format the notification message 960 for presentation on the alternate IP communications device 910. Thus, the Selection of ICW Notification Message Presentation 950 has the intelligence to associate the presentation capabilities of the alternate IP communications device 910.

Figure 10:
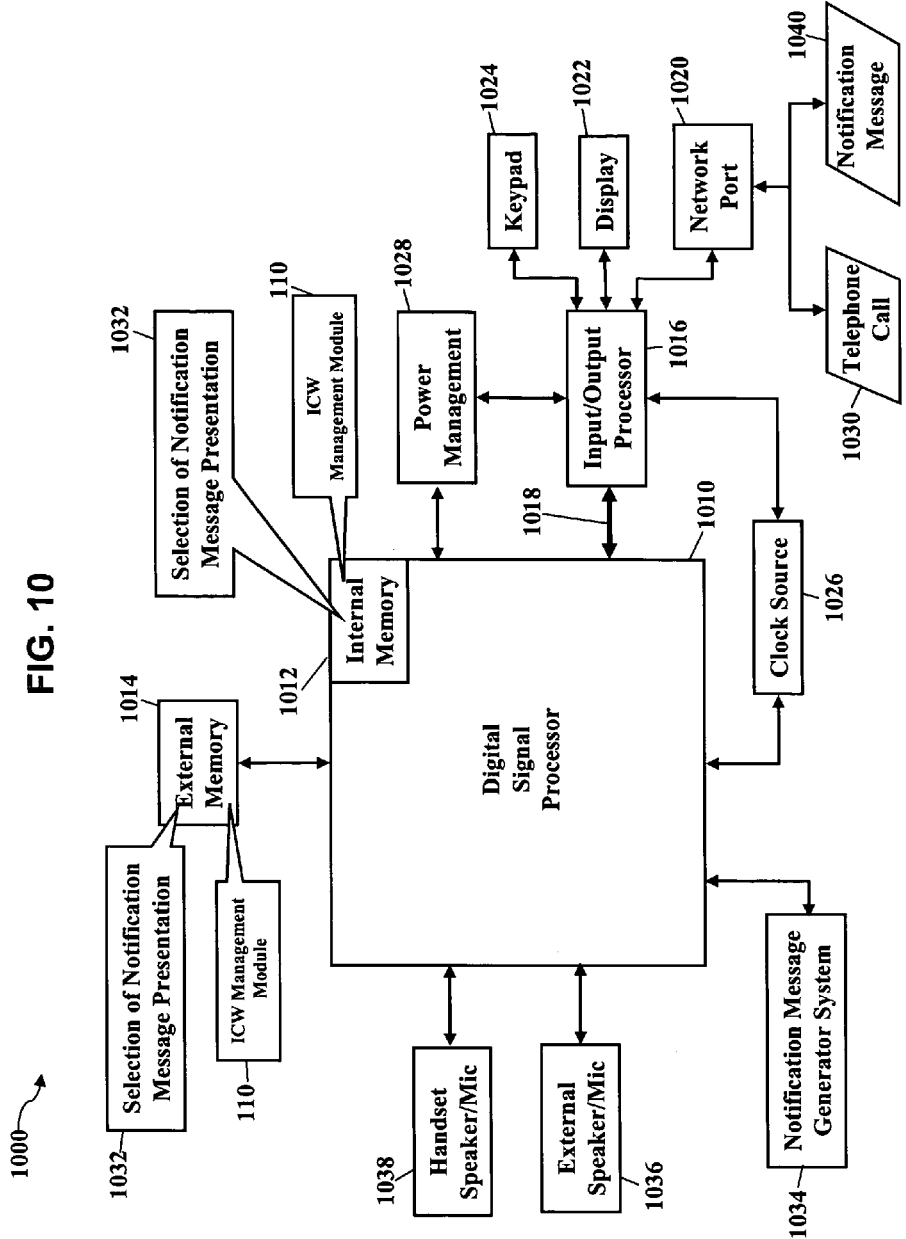
FIG. 10 is a block diagram of an exemplary apparatus that generates or otherwise transforms the notification message to an audible and/or visual announcement that can be presented by the computer system according to an exemplary embodiment of invention.

FIG. 10 is a block diagram of an apparatus 1000 according to an exemplary embodiment of this invention. This apparatus generates a notification message presentation for a notification message(s) 1040 (e.g., a disable notification message, an interrupt notification message, and/or an authorization message) to a called telephone number serviced or coupled with the computer system 100. The apparatus includes the ICW Management Module 110 operating within a memory device of a digital signal processor 1010. The memory device could include internal memory 1012 of the digital signal processor, or the memory device could include an external memory 1014 communicating with the digital signal processor 1010. The digital signal processor 1010 converts analog signals to digital signals and converts digital signals to analog signals. The digital signal processor 1010 could include compression and decompression algorithms, cancellation algorithms, audio-processing circuitry, filter circuitry, and amplifier circuitry. Although digital signal processors can be designed to provide differing capabilities and a variety of performance criteria, the basic functions of the digital signal processor are known and, thus, will not be further discussed.

The digital signal processor 1010 interfaces With an input/output processor 1016. The input/output processor 1016 controls system input/output and provides telephony-like control features. A bus 1018 provides a signal communication path between the digital signal processor 1010 and the input/output processor 1016. The input/output processor 1016 is a microprocessor that includes memory (not shown), communication controllers (not shown), and peripheral controllers (not shown). The communication controllers, for example, could control packet-based communications with a data network (shown as reference numeral 275 in FIGS. 2-9) through a network port 1020. The communication controllers could also control packet-based communications with a telecommunications switch (shown as reference numeral 235 in FIGS. 2-9) through the network port. The peripheral controllers provide an interface with an LCD/LED/CRT display 1022 and with telephony-like control features, such as a keypad 1024. A clock source 1026 provides a system clock for the apparatus 1000, and the clock source 1026 may also include higher and lower frequency multiples of the system clock depending upon power requirements and power availability. A power management system 1028 provides differing power control mechanisms, such as a sleep mode and a low-power mode, to efficiently utilize available power and to reduce thermal management concerns.

The apparatus 1000 generates the notification message presentation for the notification message 1040. If, for example, the apparatus 1000 communicates with the telecommunications switch (shown as reference numeral 235 in FIGS. 2-9), the ICW Management Module 110 causes the apparatus 1000 to visually or audibly alert a nearby customer or user of the notification message 1040. The network port 1020 receives the notification message 1040 via a communications link to the telecommunications switch (shown as reference numeral 235 in FIGS. 2-9). The notification message 1040 may include information associated with a Caller Control of ICW Services Profile (shown as reference numeral 255 in FIGS. 2-9). When the notification message 1040 is received, the digital signal processor 1010 interfaces with the ICW Management Module 110 and with the internal memory 1012 and/or the external memory 1014. The ICW Management Module 110 instructs the digital signal processor 1010 to retrieve the selected notification message presentation format from a Selection of Notification Message Presentations 1032 stored in the memory device. Alternatively, the notification message presentation format may be stored in the telecommunications network (shown in reference numeral 245 in FIGS. 2-9) or in the data network (shown as reference numeral 275 in FIGS. 2-9). The presentation format is then selected based upon the information contained within the ICW Management Module 110 and/or the Caller Control of ICW Services Profile 255 as previously discussed.

Once the presentation format is selected, the apparatus 1000 generates the notification message 1040. The digital signal processor 1010 interfaces with a Notification Message Generator System 1034. The Notification Message Generator System 1034 executes the selected presentation format, populates associated fields and/or files, and presents the notification message 1040. The digital signal processor 1000 and the Notification Message Generator System 1034 interface with an external speaker/microphone (mic) system 1036 and/or with a visual display device 1022 to audibly and/or visually present the notification message 1040.

Figure 11:
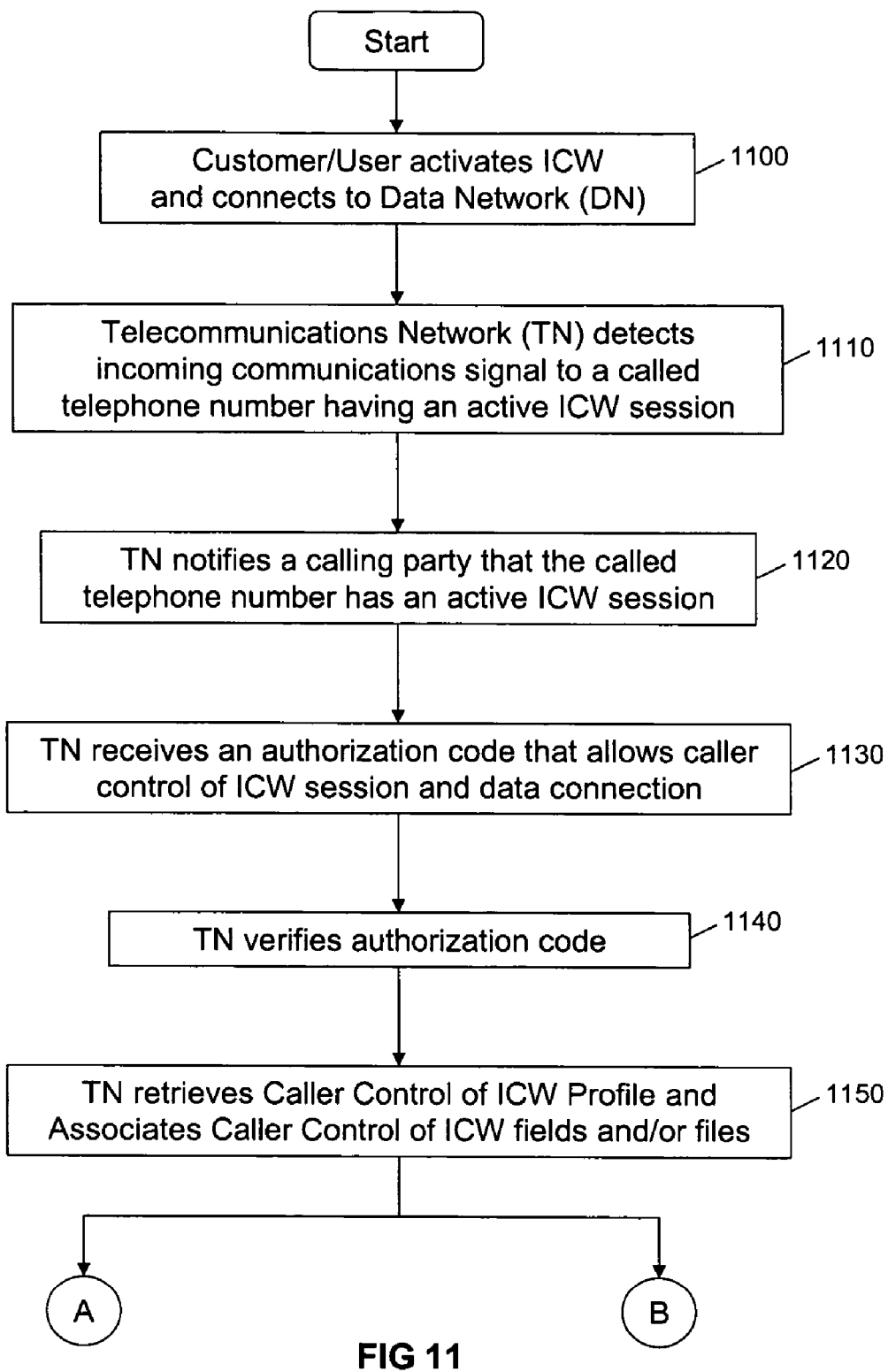
FIGS. 11-13 are flowcharts illustrating several Caller Control of ICW Service methods available to an authorized calling party over the telecommunications system architect of FIGS. 3-8.
Figure 12:
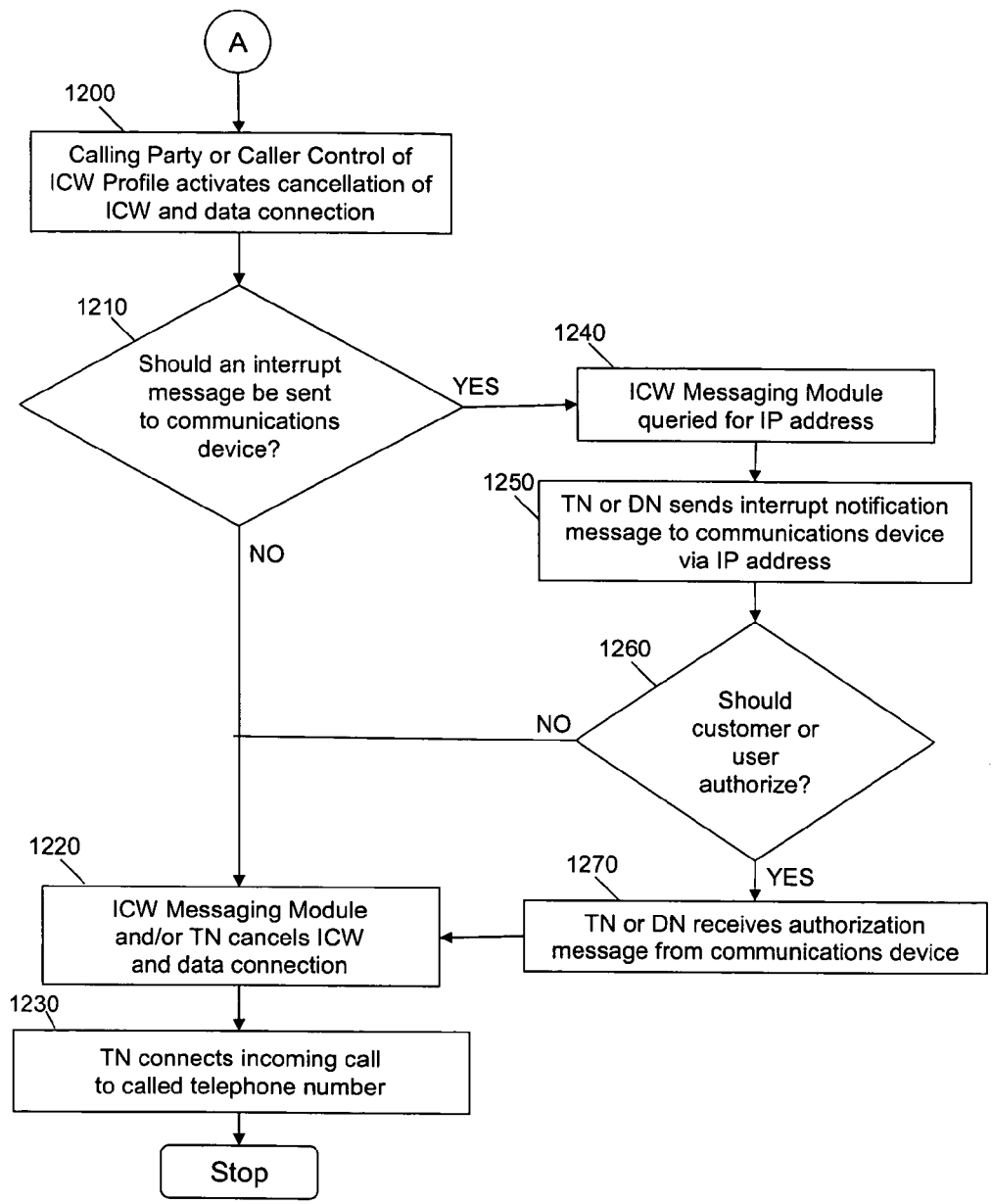
Figure 13:
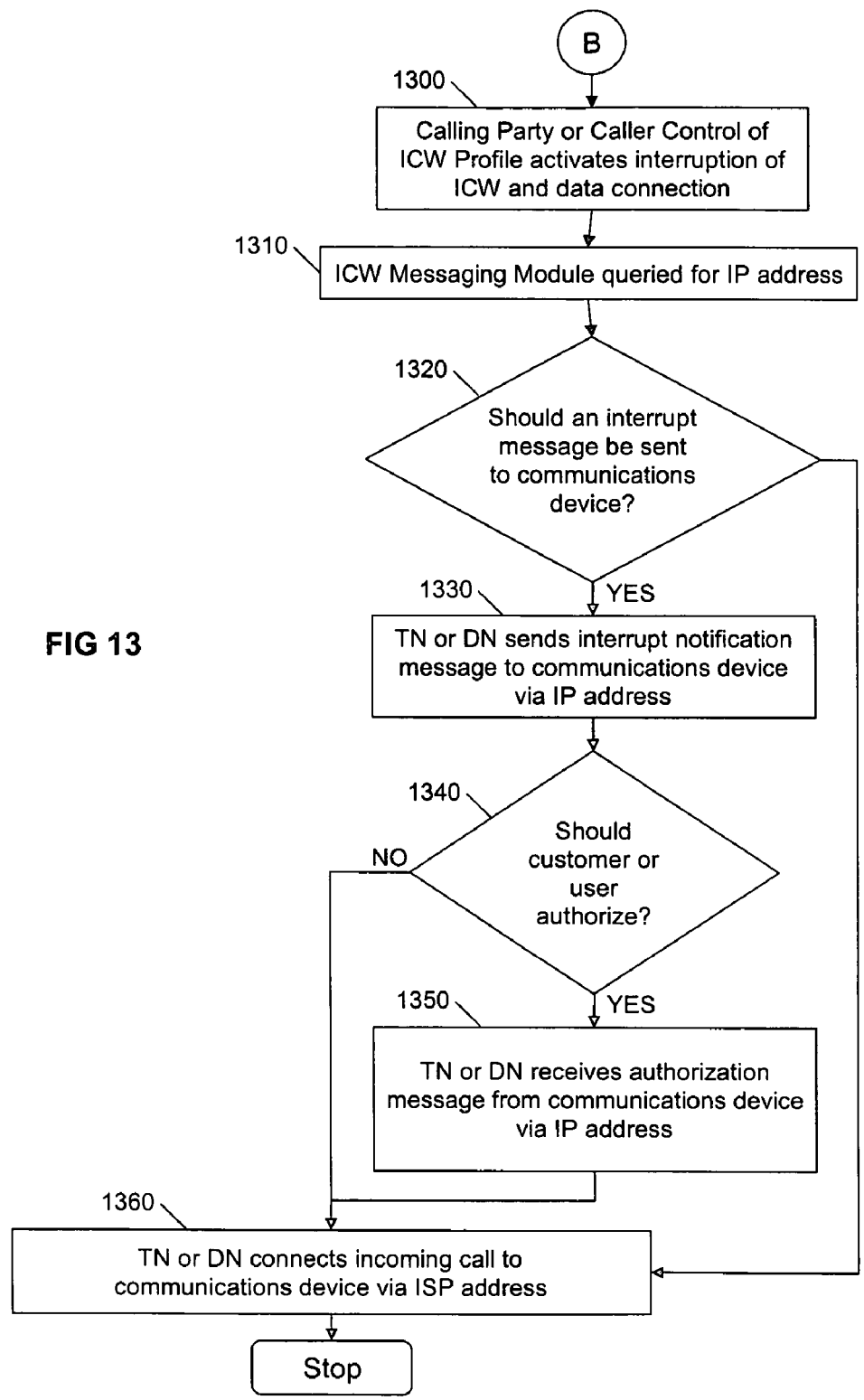

FIGS. 11-13 illustrate a flowchart showing an overview of a process for Caller Control of ICW Services according to an embodiment of this invention. A customer or user activates ICW and connects to a data network (block 1100). A telecommunications network (TN) detects an incoming communications signal to a called telephone number having an active ICW session and data connection (block 1110). The telecommunications network notifies the calling party that the called telephone number has an active ICW session and data connection (block 1120). For example, as mentioned above, the telecommunications network may play an audible announcement to the calling party that "The party you are calling has activated Internet Call Waiting and has established a data connection. Press 1 if you have an authorization code to interrupt or disconnect the Internet Call Waiting session and data connection . . . . " Thereafter, the telecommunications network receives an authorization code that accesses Caller Control of ICW Services (block 1130), verifies the authorization code (block 1140), and enables Caller Control of ICW Services (if a valid authorization code) and retrieves an applicable Caller Control of ICW Services Profile that is associated with fields and/or files for caller control (block 1150). The calling party or the Caller Control of ICW Services Profile may then activate (1) cancellation/disconnection (block 1200 of FIG. 12) or (2) interruption/suspension (block 1300 of FIG. 13).

The method continues with FIG. 12. If cancellation/disconnection is selected, the telecommunications network determines whether a notification message should be sent to the communications device (block 1210). If no notification message is to be sent, then the telecommunications network cancels the ICW session and data connection (block 1220) and connects the incoming call to the called telephone number (block 1230). If the telecommunications network determines that the notification message should be sent, then a computer system application (e.g., ICW Management Module as shown as reference numeral 110 in FIGS. 1-10) is queried for a dynamic IP address (block 1240), and the telecommunications network (via telecommunications switch) or the data network (via gateway) communicates the notification message to the communications device via the IP address (block 1250). The notification message is played by the communications device to alert the called party of the incoming call (not shown), and, thereafter, the telecommunications network determines whether the customer or user should authorize caller control of the ICW session and data connection (block 1260). If so, then the telecommunications network or data network prompts for and receives an authorization response (block 1270), disables ICW and data connection (block 1220), and connects the incoming call to the called telephone number (block 1230). If not, then the telecommunications network disables ICW and data connection (block 1220) and connects the incoming call to the called telephone number (block 1230).

FIG. 13 illustrates interruption/suspension. If interruption/suspension is selected, the telecommunications network queries the computer system software (e.g., ICW Management Module reference numeral 110 as shown in FIGS. 1-10) for a dynamic IP address (block 1310) and determines whether a notification message should be sent to the communications device (block 1320). If no notification message is to be sent, then the telecommunications network interrupts/suspends the ICW session and data connection to connect the incoming call via the IP address (block 1360). If the telecommunications network determines that the notification message should be sent, then the telecommunications network (via telecommunications switch) or the data network. (via gateway) communicates the notification message to the communications device via the IP address (block 1340). The notification message is played by the communications device to alert the customer or user of an incoming call (not shown), and, thereafter, the telecommunications network determines whether the customer or user should authorize caller control of the ICW session and data connection (block 1340). If so, then the telecommunications network or data network prompts for and receives an authorization response (block 1350) and connects the incoming call to the communications device via IP address (block 1360). If not, then the telecommunications network or data network connects the incoming call to the communications device without prompting for authorization (block 1360).

While the processes in FIGS. 11-13 are shown in series, these processes may occur in different orders and/or at simultaneous times as one of ordinary skill in the art will understand. Further, while the disclosed system and methods indicate that the notification announcement is generated by the telecommunications system and sent directly to the computer system 100 to be played, a data message (not shown) may also be sent to the computer system 100 to associate with locally stored data fields and/or files linked with the Caller Control of ICW Services Profile.

Several exemplary implementations of various embodiments of this invention are described herein; however, various modifications and alternate embodiments will occur to those of ordinary skill in the art. For example, the ICW Management Module 110 discussed above may be physically embodied on or in a computer-readable medium, such as a CD-ROM, DVD, tape, cassette, floppy disk, memory card, and large-capacity disk (such as IOMEGA®, ZIP®, JAZZ®, and other large-capacity memory products). This computer-readable medium, or media, could be distributed to end-customers, licensees, and assignees. These types of computer-readable media, and other types not mention here but considered within the scope of this invention (such as an Internet file that could be downloaded to the PC), allow the ICW Management Module 110 to be easily disseminated. Accordingly, this invention is intended to include those other variations, modifications, and alternate embodiments that adhere to the spirit and scope of this invention.

What is claimed is:

1. A method, comprising:
receiving an incoming communication via a communications network to a called telephone number, the incoming communication including an interrupt code to disconnect a data connection capability associated with the called telephone number;
verifying the interrupt code is valid; and
when the interrupt code is valid:
disconnecting an active data connection, and
preventing establishment of a subsequent data connection until receiving an authorization code to enable the subsequent data connection.

2. A method, comprising:
communicating an interrupt code with an incoming communication to a called telephone number via a communications network;
verifying the interrupt code is valid; and
when the interrupt code is valid, disabling a capability of the called telephone number to initiate a data connection until a communications connection is established for the incoming communication with the called telephone number and the communications connection is terminated.

3. The method of claim 2, further comprising: wherein the interrupt code has a capability to disconnect an Internet Call Waiting Session associated with the active data connection of the called phone number.

4. The method of claim 2, further comprising:
sending an interrupt notification message to a communications device associated with the called telephone number, the interrupt notification message comprising information associated with the incoming communication.

5. The method of claim 4, wherein the information associated with the incoming communication comprises at least one of the following:
a name of a calling party associated with the incoming communication;
a telephone number associated with the calling party; and
an alert indicating disabling of the data connection.

6. The method of claim 4, further comprising:
presenting the interrupt notification message via the communications device.

7. The method of claim 6, wherein presenting the interrupt notification message further comprises audibly presenting the interrupt notification message.

8. The method of claim 6, wherein presenting the interrupt notification message further comprises visually presenting the interrupt notification message.

9. The method of claim 2, wherein the called telephone number has an off-hook signal.

10. The method of claim 2, wherein the called telephone number has an on-hook signal.

11. A method for controlling a data connection of a called telephone number for which Internet Call Waiting is enabled, comprising:
detecting an incoming communication to a called telephone number via a communications network, the incoming communication including an authorization code to control a data connection;
processing the authorization code to select a caller control of Internet Call Waiting services profile, the caller control of Internet Call Waiting services profile comprising a name of a calling party associated with the incoming communication, a telephone number associated with the calling party, an alert providing a status of the data connection, and a control parameter, the control parameter providing a level of authority for disconnecting the data connection and preventing establishing of a subsequent data connection; and
using the control parameter to control the data connection of the called telephone number.

12. The method of claim 11, further comprising:
communicating the incoming communication to the called telephone number via an Internet Protocol address associated with the called telephone number.

13. The method of claim 11, wherein using the control parameter comprises preventing establishment of the subsequent data connection until receiving the authorization code to enable the subsequent data connection.

14. The method of claim 11, wherein using the control parameter comprises preventing establishment of the subsequent data connection until a communications connection is established for the incoming communication with the called telephone number and the communications connection is terminated.

15. The method of claim 11, further comprising:
sending an interrupt notification message to a communications device associated with the called telephone number, the interrupt notification message comprising information associated with the incoming communication.

16. The method of claim 15, the information associated with the incoming communication comprising at least one of the following:
a name of a calling party associated with the incoming communication;
a telephone number associated with the calling party; and
an alert indicating disabling of the data connection.

17. The method of claim 16, further comprising:
presenting the interrupt notification message via the communications device.

18. The method of claim 17, wherein presenting the interrupt notification message further comprises audibly presenting the interrupt notification message.

19. The method of claim 17, wherein presenting the interrupt notification message further comprises visually presenting the interrupt notification message.

20. A system, comprising:
means for receiving an incoming communication via a communications network to a called telephone number, the incoming communication including an interrupt code to disconnect a data connection capability associated with the called telephone number,
means for verifying the interrupt code is valid; and
when the interrupt code is valid:
means for disconnecting an active data connection; and
means for preventing establishment of a subsequent data connection until receiving an authorization code to enable the subsequent data connection.

21. Computer readable media storing processor-executable instructions for performing a method, the method comprising:
receiving an incoming communication via a communications network to a called telephone number, the incoming communication including an interrupt code to disconnect a data connection capability associated with the called telephone number;
verifying the interrupt code is valid; and
when the interrupt code is valid:
disconnecting an active data connection, and
preventing establishment of a subsequent data connection until receiving an authorization code to enable the subsequent data connection.

* * * * *